United States Patent [19]

Tanaka

[11] Patent Number: 4,578,860

[45] Date of Patent: Apr. 1, 1986

[54] APPARATUS FOR MANUFACTURING IRON CORE

[75] Inventor: Katsufusa Tanaka, Kawanishi, Japan

[73] Assignee: Mitsubishi Denki Kabushiki Kaisha, Tokyo, Japan

[21] Appl. No.: 515,261

[22] Filed: Jul. 19, 1983

[30] Foreign Application Priority Data

Jul. 22, 1982 [JP] Japan ............................ 57-129470

[51] Int. Cl.$^4$ ............................ B23P 19/00

[52] U.S. Cl. ............................ 29/738; 29/799; 414/27; 414/51; 414/75

[58] Field of Search ............................ 29/609, 738, 799; 198/690; 414/29, 51, 75

[56] References Cited

U.S. PATENT DOCUMENTS

| | | | |
|---|---|---|---|
| 2,350,273 | 5/1944 | Decker | 414/27 |
| 3,672,265 | 6/1972 | Schwarzkopf | 414/51 X |
| 3,987,911 | 10/1976 | Euverard et al. | 414/75 X |
| 4,047,621 | 9/1977 | Stötzel et al. | 414/75 |

FOREIGN PATENT DOCUMENTS

| | | | |
|---|---|---|---|
| 50-23485 | 8/1975 | Japan . | |
| 48211 | 11/1982 | Japan | 29/799 |

*Primary Examiner*—Mark Rosenbaum
*Assistant Examiner*—Timothy V. Eley
*Attorney, Agent, or Firm*—Wenderoth, Lind & Ponack

[57] ABSTRACT

Three leg tablelets are disposed on a vertically movable truck extending in parallel spaced relationship in a longitudinal direction with a yoke tablelet located along one side of the truck in a cross direction. Two parallel spaced conveyors are disposed above the leg tablelets to have two positions in each of which they are vertically aligned with either one of the outer leg tablelets and the central leg tablelet. A magnet is normally located to each of the conveyors to magnetically attract a magnetic lamination to the travelling conveyors to move it to a predetermined position relative to the aligned leg tablelet whereupon the conveyors are stopped. The magnet can be lifted after or before a change in position of the conveyors in the cross direction, to cause the magnetic lamination to fall on the mating leg tablelet. Each of two robots disposed adjacent to the yoke tablelets for cooperation with a corresponding positioning element to dispose magnetic laminations separately conveyed at a predetermined position on the yoke tablelet. In use the operations are repeated to stack the magnetic laminations into an E-shaped iron core.

10 Claims, 34 Drawing Figures

APPARATUS FOR MANUFACTURING IRON CORE

BACKGROUND OF THE INVENTION

This invention relates to an apparatus for manufacturing an iron core for a reactor, a transformer or the like, and more particularly a plurality of legs of such an iron core.

Core type iron cores have been previously manufactured by manually classifying magnetic laminations cut into predetermined shapes into a plurality of groups thereof for three legs and four yokes of the iron cores, manually carrying the classified magnetic laminations near an assembling surface plate and then having the laminations stocked in a predetermined shape on the surface plate by a plurality of persons.

Also, E-shaped iron cores might be manufactured by disposing magnetic laminations for three legs thereof at predetermined equal intervals to be aligned with one another for each leg and delivering three sets of the magnetic laminations to a lamination stacking surface plate through a chute system until those magnetic laminations are spontaneously stopped due to frictional resistances occurring between the adjacent magnetic laminations. Then, the three sets of the leg laminations thus stopped are manually located at their final positions respectively followed by the operation of manually stacking magnetic laminations for each of two yokes of the E-shaped iron core.

Thus, almost all of the conventional operations of stacking magnetic laminations on one another have been manually performed, resulting in the disadvantages that a long time is consumed, iron loss increases due to strains imparted to the laminations during the handling thereof and so on.

Accordingly, it is an object of the present invention is to eliminate the disadvantages of the prior art practice as described above by the provision of an apparatus for manufacturing a plurality of legs of an iron core by substantially eliminating or minimizing the operation of manually handling magnetic laminations for the legs.

SUMMARY OF THE INVENTION

The present invention provides an apparatus for manufacturing an iron core, comprising a plurality of lamination stacking tabelets (small tables or platforms) in the shape of rectangles disposed in parallel relationship in the direction of the common longitudinal axis thereof and in spaced relationship in a cross direction perpendicular to the common longitudinal direction, the plurality of lamination stacking tablelets being relatively movable in the cross direction, a pair of parallel spaced conveyors disposed above the plurality of lamination stacking tabelets and movable in the cross direction to selectively oppose any adjacent two of the plurality of lamination stacking tablelets, and magnetic attraction means disposed on one side of each of the conveyors opposite to the lamination stacking tablelets to magnetically attract a magnetic lamination thereto to permit the magnetic lamination to be moved in the common longitudinal direction with the travel of the mating conveyor, the arrangement being such that the magnetic laminations on the conveyors are conveyed in the common longitudinal direction predetermined equal distances by means of the magnetic attraction means and also in the cross direction predetermined equal distances through the movement of the conveyors in the cross direction thereby to successively dispose the magnetic laminations on the lamination stacking tablelets to form stacks of the magnetic laminations for a plurality of legs of the iron core thereon.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
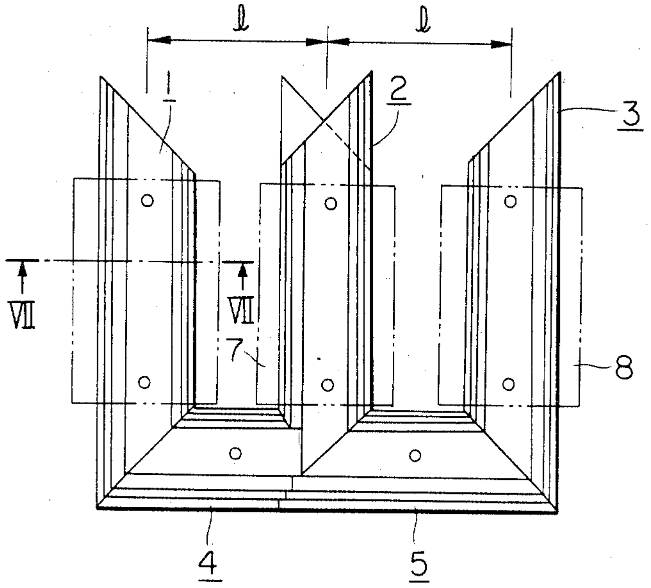
FIG. 1 is a plan view of an E-shaped iron core formed of magnetic laminations by stacking them on one another.

Referring now to FIG. 1 of the drawings, there is illustrated on E-shaped iron core. The arrangement illustrated comprises an outer leg, a central leg and another outer leg generally designated by the reference numerals 1, 2 and 3, respectively, and disposed in parallel to one another to be spaced from one another by equal center-to-center distances of l. The central leg 2 includes one end, in this case, the lower end as viewed in FIG. 1, connected to the adjacent ends of the outer legs 1 and 3 through a pair of yokes generally designated by the reference numerals 4 and 5. Then three phase winding assemblies 6, 7 and 8 are disposed around the legs 1, 2 and 3, respectively, after which another pair of yokes generally designated by the reference numerals 9 and 10 (not shown in FIG. 1) are disposed to connect the other end of the central leg 2 to the other ends of the outer legs 1 and 3, respectively, to complete an iron core for a three legged three-phase transformer of the core type.

Figure 2:
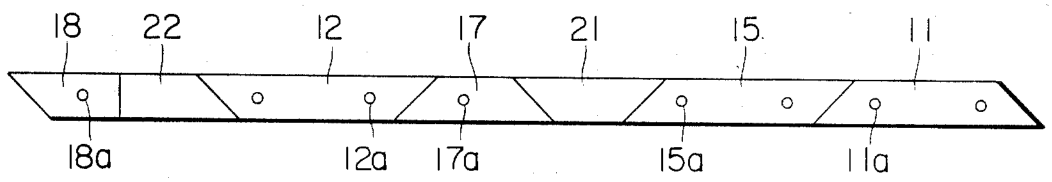
FIGS. 2 and 3 are plan views illustrating the manner in which respective magnetic strips are cut into the laminations for forming the arrangement shown in FIG. 1 and those disposed on open sides of the arrangement.
Figure 3:
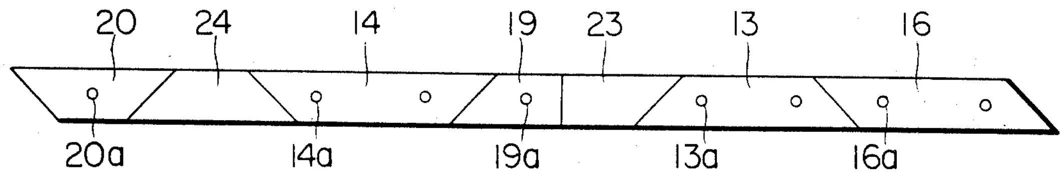

Each of those legs and yokes is formed of a stack of magnetic laminations having predetermined shapes. Those magnetic laminations are cut away from strips of a magnetic sheet in the shapes of parallelograms as shown in FIGS. 2 and 3. Each of the strips has a predetermine width and a predetermined length, and the edges at both ends thereof are tilted at angles of 45 degrees to the longitudinal axis thereof in opposite directions.

More specifically, the strip illustrated in FIG. 2 is cut into a trapezoid lamination 11, a parallelogram lamination 15, an inverted trapezoid lamination 21, a trapezoid lamination 17, an inverted trapezoid lamination 12, a trapezoid lamination 22 and an inverted trapezoid lamination 18 starting with the righthand end thereof as viewed in FIG. 2. All the laminations have the cut ends tilted at angles of 45 degrees to the longitudinal axis of the strip excepting that one end of the laminations 22 and 18 is cut at an angle of 90 degrees to the longitudinal axis. Each of the laminations 11, 15 and 12 includes a pair of positioning holes 11*a*, 15*a* or 12*a* on the longitudinal axis thereof, and each of the laminations 17 or 18 includes a single positioning hole 17*a* or 18*a* on the longitudinal axis thereof, but the laminations 21 and 22 include no positioning hole. The two holes in the respective laminations 11, 15 and 12 are equally spaced from each other.

Figure 4:
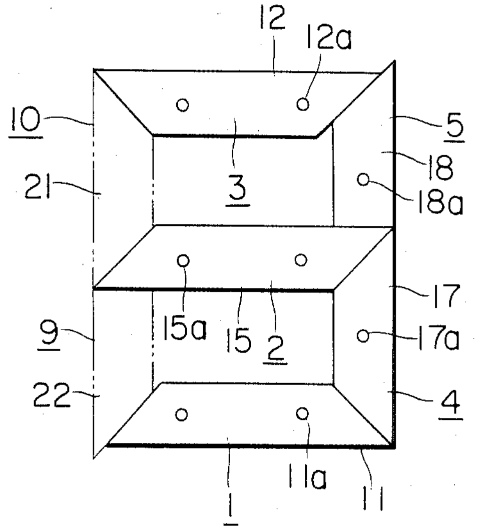
FIG. 4 is a plan view of the magnetic laminations cut from the magnetic strip shown in FIG. 2 and arranged in an E-shape to form a first layer thereof along with the remaining two laminations shown in broken line.

Those laminations are arranged in abutting relationship as shown in FIG. 4 so that the laminations 11, 15 and 12 are disposed at the respective positions of the legs 1, 2 and 3 as shown in FIG. 1 and the laminations 17 and 18 are disposed at the respective positions of the yokes 4 and 5 as shown in FIG. 1, to form a first layer of the E-shaped iron core shown in FIG. 1. As shown at broken line in FIG. 4, the laminations 22 and 21 are disposed to connect the lamination 15 to the respective laminations 11 and 12 in a later step to form first layers of the respective yokes 9 and 10.

Also, the magnetic strip illustrated in FIG. 3 is cut into a parallelogram lamination 16, a trapezoid lamination 13, an inverted trapezoid lamination 23, a trapezoid lamination 19, an inverted trapezoid lamination 14, a trapezoid lamination 24 and an inverted trapezoid lamination 20 starting with the righthand end thereof as viewed in FIG. 3. All the laminations have the cut ends tilted at angles of 45 degrees to the longitudinal axis of the strip excepting that one end of the laminations 23 and 19 is cut at an angle of 90 degrees to the longitdinal axis. The laminations 16, 13 and 14 includes respective pairs of positioning holes 16*a*, 13*a* and 14*a* on the longitudinal axis thereof, and each of the laminations 19 and 20 includes a single positioning hole 19*a* or 20*a*, but the laminations 23 and 24 include no positioning hole. The two positioning holes in the respective laminations 16, 13, and 14 are equally spaced from each other as are the positioning holes in laminations 11, 15 and 12.

Figure 5:
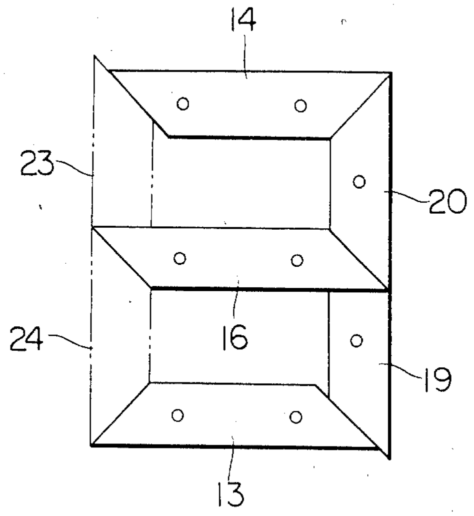
FIG. 5 is a view similar to FIG. 4 but illustrating the magnetic laminations cut from the magnetic strip and arranged in the E shape to form a second layer thereof.

As shown in FIG. 5, the laminations 13, 16 and 14 are disposed to form second layers of the respective legs 1, 2 and 3, and the laminations 19 and 20 are disposed to form second layers of the respective yokes 4 and 5. The laminations 24 and 23 are disposed at the positions of the yokes 9 and 10 at the above mentioned later step as were the laminations 22 and 21 in forming the first layers.

Subsequently, the E-shaped arrangement of the laminations shown in FIG. 5 is disposed on that shown in FIG. 4 resulting in the arrangement illustrated in FIG. 6 with the positioning holes in the first layer aligned with the corresponding ones in the second layer.

Figure 6:
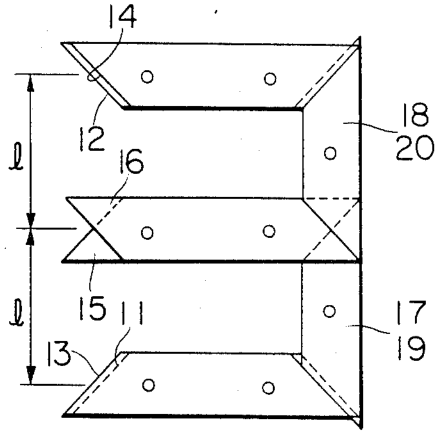
FIG. 6 is a plan view of the magnetic laminations of the second layer shown in FIG. 5 and stacked on those of the first layer shown in FIG. 4.

Following this, a plurality of the arrangements shown in FIG. 6 are stacked on one another to form a stack so that first layers alternate second layers to a predetermined thickness.

Figure 7:
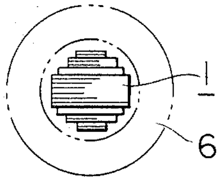
FIG. 7 is a sectional view of the arrangement shown in FIG. 1 as taken on the line VII—VII of FIG. 1.

It is noted that the stack thus formed has disposed at each end thereof a tapered stack of magnetic laminations similar to those shown in FIGS. 2 and 3 except that their widths decrease stepwise, and they are stacked on one another in the same manner as described above to render a cross section of each of the legs and yokes approximately circular as shown typically by the cross section of the outer leg 1 in FIG. 7.

The stacking operation as described above has been previously performed by preliminarily classifying the laminations cut as shown in FIGS. 2 and 3 into laminations for legs 1, 2 and 3 and those for the yokes 4, 5, 9 and 10, after which the classified laminations are manually carried to near an assembling surface plate and then stacked on one another by several persons.

Alternatively, the laminations for the legs 1, 2 and 3 have been arranged to keep the predetermined spacings therebetween as shown in FIG. 4 and then delivered into an assembling jig on a lamination stacking surface plate by means of a chute system until those magnetic laminations are spontaneously stopped due to frictional resistances developed between adjacent laminations.

Then three sets of the leg laminations thus stopped are manually located at their final position respectively followed by the operation of manually stacking magnetic lamination for each of the yoke 4 and 5, resulting in the arrangement of FIG. 1. In that event the manual labor has been rendered more troublesome by the requirement to stack the laminations in successively decreased width as shown in FIG. 7. This is because each time the stacking operation has been completed on each layer, it is required to set positioning jigs for the next succeeding laminations.

From the foregoing it is seen that the conventional stacking methods have been carried out almost entirely by manual labor, resulting in the disadvantage that much time is consumed. Also, there has been another disadvantage that, during the handling thereof the laminations are strained to cause an increase in iron loss.

The present invention contemplates to eliminate the disadvantages of the prior art practice as described above by the provision of an iron core manufacturing apparatus including a pair of conveyors capable of conveying magnetic leg laminations attached to lower portions thereof and arranged to be alternately moved so as to maintain predetermined spacings between the resulting legs, thereby to stack the laminations on one another for each of the legs.

Figure 8:
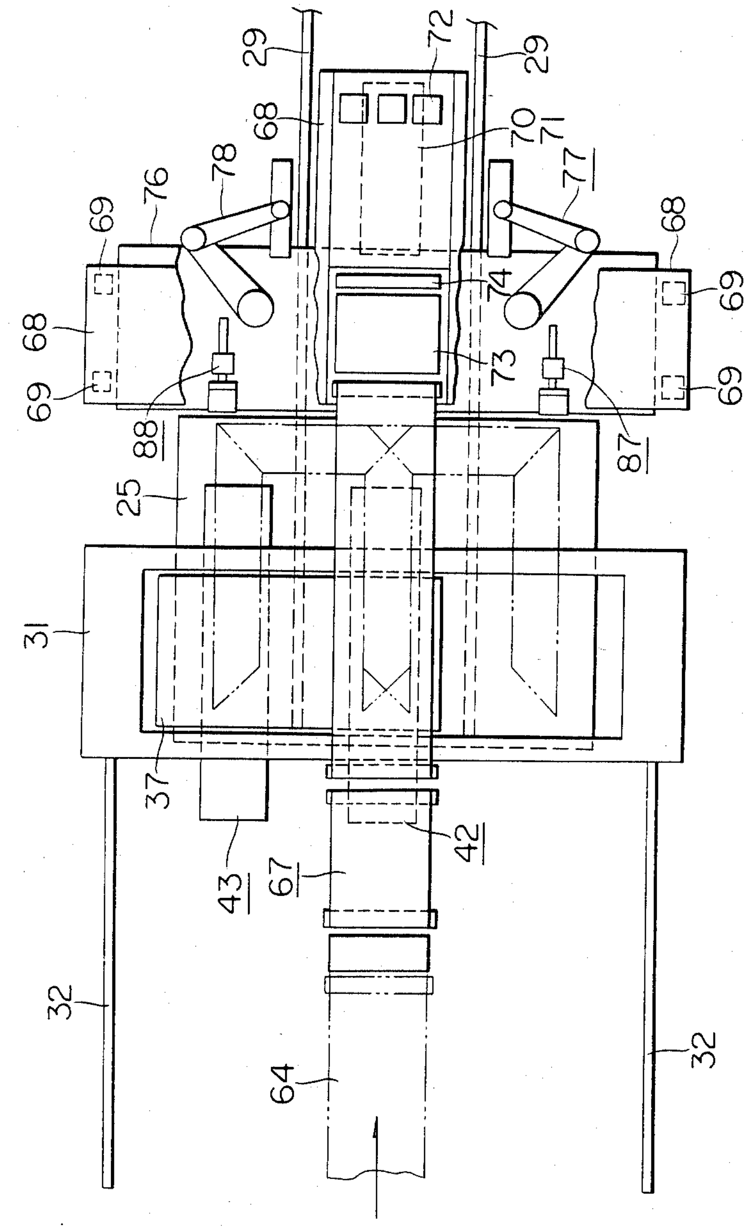
FIG. 8 is a plan view of one embodiment of the iron core manufacturing apparatus of the present invention with a part broken away and with parts omitted.
Figure 9:
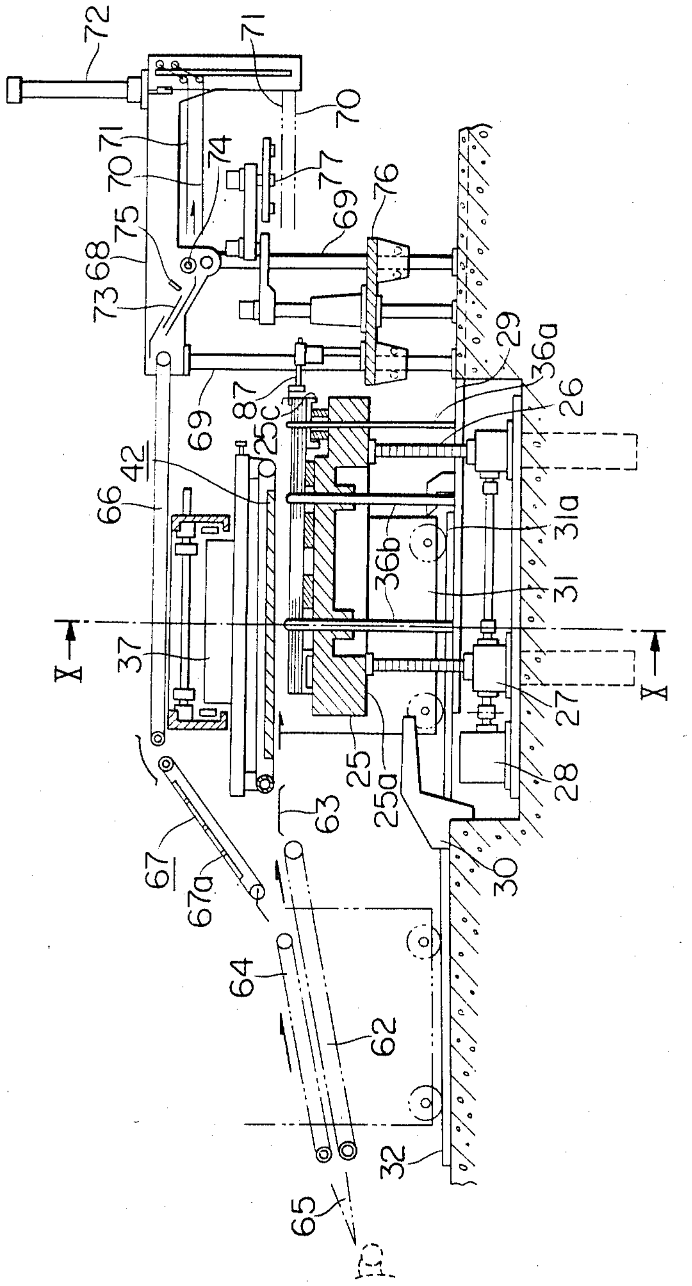
FIG. 9 is a front elevational view, partly in section of the arrangement shown in FIG. 8.
Figure 10:
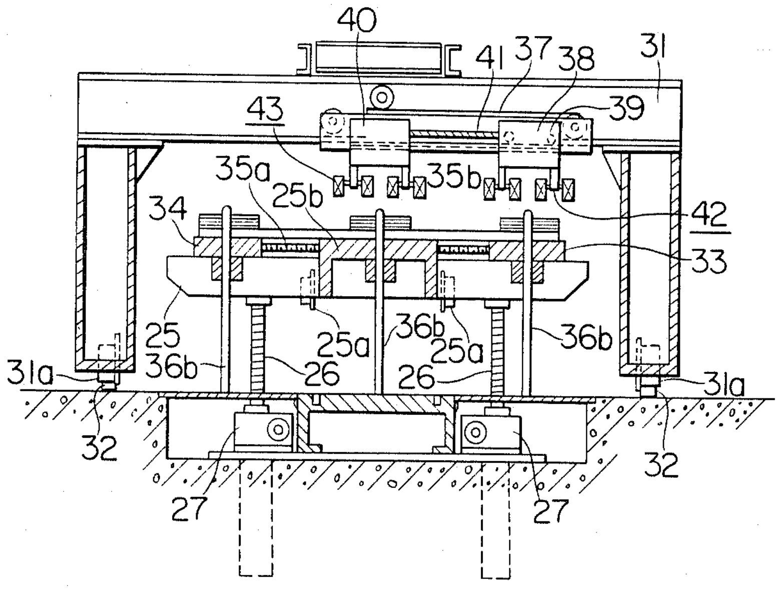
FIG. 10 is a sectional view of the arrangement shown in FIGS. 8 and 9 as taken on the line X—X of FIG. 9.

Referring now to FIGS. 8, 9 and 10, there is illustrated one embodiment according to the iron core manufacturing apparatus of the present invention. The arrangement illustrated comprises a lamination stacking truck 25 disposed horizontally and including four wheels 25*a*. In FIG. 9 the truck 25 is shown as being supported by a plurality of vertical supporting bars 26, in this case, four bars which are, in turn, operatively coupled to respective jacks 27 connected to one another. One of the jacks 27 is connected to a drive mechanism 28. As shown best in FIG. 9, the jacks 27 and the drive mechanism 28 are fixedly located in a recess disposed on a foundation and including a cover for covering the recess. The supporting bar 26 movably extend through the cover and can be vertically moved by the drive mechanism 28 through the mating jacks 27. Also, a stopper 30 is centrally disposed on the lefthand edge as viewed in FIG. 9 of the recess to prevent the truck 25 from being moved in a lefthand direction as viewed in FIG. 9 beyond the same.

The wheels 25*a* (not shown in FIG. 9) on the truck 25 are arranged to roll along a pair of parallel rails 29 running in a direction of width of the truck (see FIG. 8) which is called hereinafter a longitudinal direction, but the wheels 25*a* are shown in FIG. 10 as being in disengagement from the rails 29.

As shown best in FIG. 10, a gate-shaped supporting truck 31 movably stands via wheels 31*a* on another pair of parallel rails 32 parallel to the rails 29 to straddle the lamination stacking truck 25 in a direction perpendicular to the longitudinal direction and called hereinafter a cross direction.

The lamination stacking truck 25 includes a central leg lamination stacking tablelet (small table or platform) 25*b* (see FIG. 10) fixed on the surface thereof to centrally extend in the longitudinal direction, a pair of outer leg lamination stacking tablelets 33 and 34 disposed on the surface thereof on both side of the central tablelet 25*b* to be parallel to and spaced away from the latter by adjustable equal distances, and a yoke lamination stacking tablelet 25*c* extending on the righthand edge as viewed in FIG. 9 of the surface thereof in the cross direction. All the tablelets are flush with one another to form a lamination stacking table. In order to adjust the distance between the central tablelet 25*b* and each of the outer tablelets 33 or 34, adjusting threaded rod 35*b* or 35*a* is screwed into the central tablelet 25*b* and the outer tablelet 33 or 34 as shown in FIG. 10 and driven by a drive mechanism (not shown).

Figure 11:
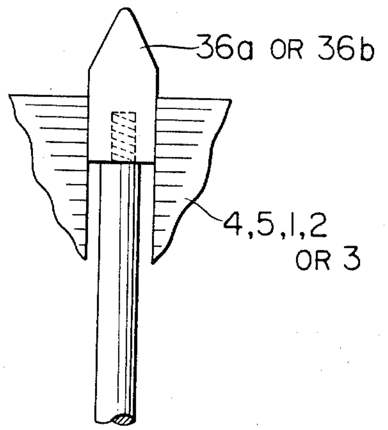
FIG. 11 is a front elevational view of the essential part of the positioning pin shown in FIGS. 9 and 10.

Also, a pair of positioning pins 36*a* are detachably inserted into the yoke tablelet 25*c* and that portion of the the truck 25 overlaid therewith so as to be detachably fitted into the associated positioning holes on the yoke laminations disposed on the tablelet 25*c* and a pair of positioning pins 36*b* are respectively detachably inserted into each of leg tablelets 25*b*, 22 and 34 and that portion of the truck 25 overlaid therewith so as to be detachably fitted into the positioning hole in the leg lamination disposed on each of the leg tablelets. Those positioning pins as viewed in FIG. 9 are supported at their lower ends by the cover for the recess as described above with the upper end portions somewhat extending beyond stacks of laminations formed on the respective mating tablelets and have large diameter portions terminating at tapered ends screw threaded onto the respective upper ends thereof as seem in FIG. 11. Also, the large diameter portion has an outer diameter substantially equal to the inside diameter of the positioning hole in the lamination.

Also as shown in FIG. 10, a conveying carriage 37 is supported by that portion of the supporting truck 31 opposing the lamination stacking truck 25 so as to be capable of being moved in a reciprocating manner in a direction of movement of the truck 31 or the cross direction by means of a drive mechanism (not shown). The conveying carriage 37 includes a first suspension device 38 suspended from the conveying carriage 37 on wheels 39 to be capable of being moved in reciprocating manner in the cross direction, and a similar second suspension device 40 fixed to the conveying carriage 37. An adjusting threaded rod 41 is screw threaded into the two devices 38 and 40 and serves to adjust a distance between the devices 38 and 40 through the rotation thereof.

Figure 12:
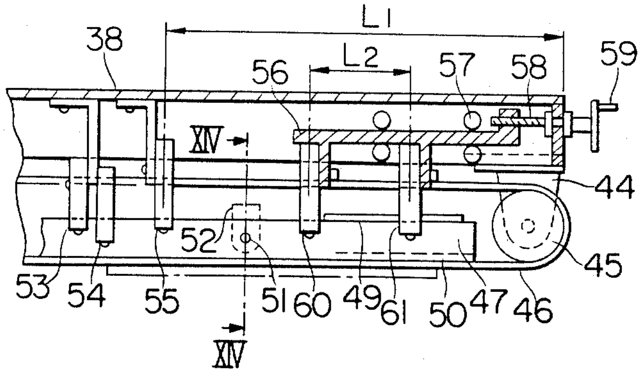
FIG. 12 is a front elevational view, partly in section, of the conveyors for leg laminations shown in FIGS. 8, 9 and 10 and aligned with each other in a direction perpendicular to the plane of FIG. 12.
Figure 13:
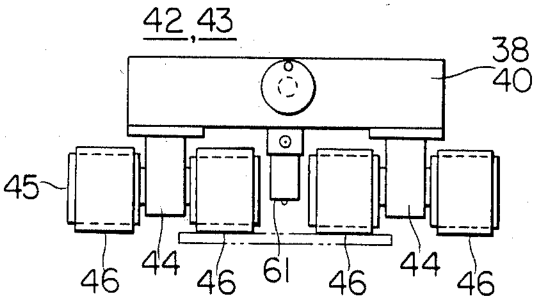
FIG. 13 is a side elevational view of the arrangement shown in FIG. 12.

A first and a second conveyor generally designated by the reference numerals 42 and 43 are suspended by the first and second suspension devices 38 and 40, respectively. The first and second conveyors 42 and 43 are identical to each other and one of them, for example, the first conveyors 42, will now be described in conjunction with FIGS. 12, 13 and 14. FIG. 12 show only the details of the first conveyor 42 because the second conveyor 43 is disposed in aligned relationship with the first conveyor 42 in the rear thereof as viewed from the viewer.

The first conveyor 42 includes a bearing 44 pendent from one end of the first suspension device 38, a pair of pulleys 45 journalled by the bearing 44 on both sides, and driven by a drive mechanism (not shown) and a pair of endless belts 46 spanned in parallel spaced relationship between the pulleys 44 and opposite pulleys (not shown) similarly mounted to the opposite end of the first suspension device 38.

Figure 14:
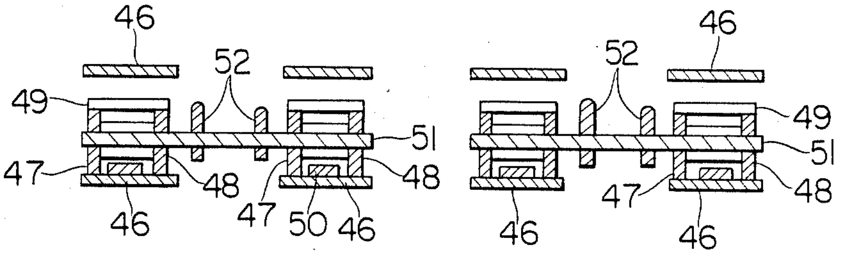
FIG. 14 is a sectional view as taken on the line XIV—XIV of FIG. 12.

A pair of permanent magnets 47 and 48 are disposed between upper and lower runs of each endless belt 46 throughout the substantial portion of the lower run (see FIG. 12) so that the permanent magnets 47 and 48 have an N pole and an S pole abutting in sliding relationship against the upper surface of the endless belt 46 in the lower run and the other poles spaced away from the lower surface of the endless belts 46 in the upper run and bridged by an adjusting magnetic strip 49 attacted to the other poles to serve as means for adjusting a magnetic force caused from by the opposite magnets 47 and 48 as shown in FIG. 14. Further a keep plate 50 is disposed on the lower surface of each endless belt 46 between the permanent magnets 47 and 48 to be substantially coextensive with the latter 48 slidably pushing the endless belt 46 in a downward direction as viewed in FIG. 14. Also in FIG. 14, a connecting rod 51 is shown as being parallel to the parallel endless belts 46 to fixedly extending through the central portions of the permanent magnets 47 and 48 to connect the opposite permanent magnets 47 and 48 for the two endless belts 46 in pairs. A raising link 52 is operatively coupled to the connecting rod 51 between the pair of endless belts 46 to raise and lower the permanent magnets 47 and 48 by means of a drive mechanism (not shown).

As shown in FIG. 12, a first, a second and a third sensor 53, 54 and 55, respectively, are connected to the first suspension device 38 in the named order starting with the intermediate portion of the endless belts 46 to face a space formed between the parallel endless belts 46. Each of those sensors may be formed of a beam switch for sensing a distance therefrom by the reflection of light. The first sensor 53 senses the fall of a leg lamination from the first conveyor 42, the second sensor 54 senses a distance between the same and leg laminations stacked on the leg lamination stacking tablelet on the truck 25 and the third sensor 55 senses a leading end of a leg lamination conveyed by the first conveyor 42.

The first suspension device 38 further includes an L-shaped movable plate 56 horizontally disposed thereon, two separated pairs of upper and lower guide rollers 57 for slidably sandwiching the movable plate 56 therebetween, a feed screw 58 screw threaded into the vertical leg of the "L", and a handle 59 rotatably supported by the first suspension device 38 and fixed to the feed screw 58. Thus, the handle 59 can be rotated to horizontally move the movable plate 56 in the longitudinal direction through the feed screw 58.

As shown in FIG. 12, a fourth and a fifth sensor 60 and 61, respectively, are fixed to an intermediate portion of the movable plate 56 to face the space between the pair of parallel endless belts 46 to sense the positioning holes on a leg lamination conveyed by the first conveyor 42. The sensors 60 and 61 may be similar to the sensors 53–55 described above.

Referring back to FIG. 9, a third conveyor 62 shown on the lefthand portion of the figure is in the form of an endless belt tilted upward in the longitudinal direction and terminates in the proximity of a guide 63 located between the same and the first and second conveyors 42 and 43. The third conveyor 62 successively conveys the magnetic laminations 11 through 16 for the leg 1, 2 and 3 in the manner to be described below. A fourth conveyor 64 in the form of an endless belt is disposed above the third conveyor 62 to be substantially parallel to and shorter than the latter. The fourth conveyor 64 serves to successively convey the magnetic laminations 12 through 20 for the yokes 4 and 5 in the manner to be described below. Also, a flapper 65 is disposed adjacent to the lefthand ends as viewed in FIG. 9 of the third and fourth conveyors 62 and 64, respectively, to selectively deliver the associated magnetic laminations to the third and fourth conveyors 62 and 64. A fifth conveyor 66 in the form of an endless belt is horizontally disposed on the top surface of the supporting truck 31 and includes one end positioned on the adjacent side of the truck 31 to successively receive the yoke laminations from a sixth conveyor 67 in the form of an endless belt disposed between the fifth conveyor 66 and the third conveyor 64. The sixth conveyor 67 is operative to successively convey the yoke laminations from the third conveyor 64 to the fifth conveyor 66 while holding the yoke laminations on the same with magnetic attraction originating from an array of permanent magnets 67*a* slidably disposed on the lower surface of the conveyor 67 in the upper run thereof.

As shown in FIG. 8, a T-shaped stationary framework 68 is disposed on the side of the yoke tablelet 25*c* on the laminations tacking truck 25 put at its operating position, and includes a cross head of the "T" parallel and substantially equal in length to the top surface of the supporting truck 31 extending in the cross direction with the leg thereof extending away from the truck 25 in the longitudinal direction. The stationary framework 68 is supported on the foundation through two pairs of vertical supporting columns 69 connected at one end to the lower surface of the cross head of the T, one pair for each end (see FIG. 8), and connected at the other ends to the foundation (see FIG. 9).

A pair of first and second rectangular receiving plates 70 and 71 are vertically movably supported by the free end of the leg of the T-shaped stationary framework 68 to be superposed on each other. A hoisting cylinder 72 is disposed on the upper surface of the leg of the "T" to vertically move the receiving plates 70 and 71 from their upper positions shown at solid line in FIG. 9 to their lower positions shown at broken line in FIG. 9 and vice versa.

Figure 15:
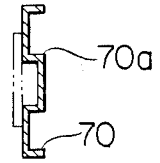
FIG. 15 is a sectional view as taken on the line XV—XV of FIG. 16A.

The first and second receiving plates 70 and 71 are identical to each other and one of them, for example, the first plate 70 will now be described in conjunction with FIG. 15. As shown, the first receiving plate 70 includes a central longitudinal recess 70*a* running in the longitudinal direction and a pair of opposite sides parallel to the recess 70*a* and folded in a direction of depth of the recess 70*a*. The recess 70*a* causes sensors to be described below to easily sense the positioning hole on a yoke lamination put on the receiving plate 70 to be described below.

As shown in FIGS. 8 and 9, the end of the fifth conveyor 66 far from the sixth conveyor 67 is slightly extended into the central portion of the cross head of the T-shaped framework 68. Within the cross head of the T-shaped framework 68 a chute 73 is disposed adjacent to the far end of the fifth conveyor 66 and extends in a rightward and downward direction as viewed in FIG. 9 to the proximity of a pair of pinch rollers 74 disposed adjacent to the first and second receiving plates 70 and 71 at their upper positions and driven by a variable speed motor (not shown). The chute 73 successively receive the yoke laminations from the fifth conveyor 66 and successively delivers them to the pinch rollers 74.

Further, a sixth sensor 75 similar to the first sensor 53 is disposed to be opposite to the chute 73 in order to sense the tail end of each of the yoke laminations passed through the chute 73.

Also as shown in FIG. 9, a horizontal rectangular bench 76 is supported for vertical movement on the supporting columns 69, to be located below the cross head of the T-shaped stationary framework 68. The bench 76 has such a size that it is put between the supporting columns 69 (see FIG. 8) and driven by a drive mechanism (not shown).

When viewed in the cross direction, the rectangular bench 76 is disposed parallel to the yoke tablelet 25*c* on the lamination stacking truck 25 to leave a narrow gap therebetween.

A pair of robots generally designated by the reference numerals 77 and 78, respectively, are disposed below the stationary framework 68 by having respective pivot shafts erected on the surface of the bench 76 to be nearly aligned with the outer leg tablelets 33 and 34 on the lamination stacking truck 25 and also more remote from the truck 25 than the central axis running in the cross direction of the bench 76 and equidistant from the central axis thereof running in the longitudinal direction. The robots 77 and 78 are identical to each other and shown in FIG. 8 as being arranged symmetrically with respect to the last mentioned central axis. One of the robots, for example, the robot 77 will now be described in conjunction with FIGS. 16A and 16B. The robot 77 includes, in addition to the pivot shaft as described above, a first rotatable arm 79 rotatably mounted at one end to the free end of the pivot shaft, a second rotatable arm 80 rotatably mounted at one end to the other end of the first arm 79, and a holding arm 81 in the form of a rectangular strip rotatably mounted at its center to the other end of the second arm 80 with all the arms arranged horizontally. The holding arm 81 is provided on the lower surface thereof as viewed in FIG. 9 with a plurality of vacuum pads 82, in this case, three pads at predetermined equal intervals serving to attract a yoke lamination such as the lamination 17 to the holding arm 81 therethrough. As shown in FIG. 16B, the connection of the second pivotal arm 80 and the holding arm 81 is provided on the lower surface as viewed in FIG. 9 with a seventh through a tenth sensor 83, 84, 85 and 86 located at equal angular intervals in a circle having its center lying at that of the connection. Those sensors are similar to the first sensor 53 and serve to sense the positioning hole on each lamination put on the receiving plate 70 or 71.

In this way each of the robots 77 and 78 is formed of the components 70 through 86 and is controlled by a computer and a servometer associated therewith but not illustrated only for purposes of simplicity.

Figure 16A:
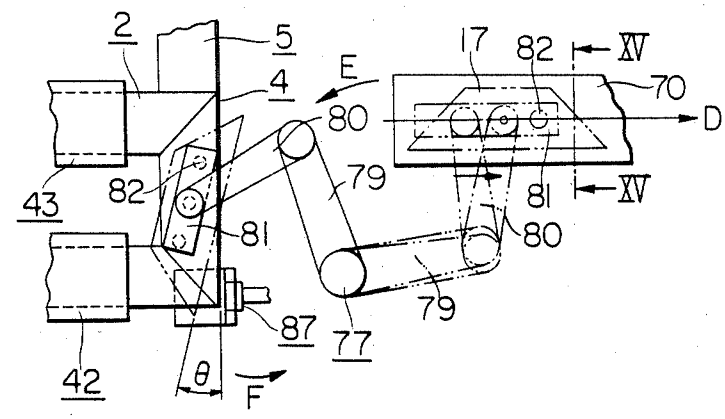
FIG. 16A is a plan view of one of the robots shown in FIG. 8 and the associated components.
Figure 16B:
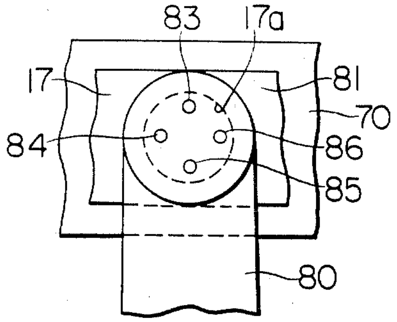
FIG. 16B is an enlarged plan view of the essential part of the arrangement shown in FIG. 16A.

Further, the pivotal arms 79 and 80 and the holding arm 81 are arranged to be rotated through predetermined angles about the respective axis of rotation thereof to change from their position shown at solid line in FIG. 16A to their positions shown at broken line in FIG. 16A in the direction of the arrow E illustrated in FIG. 16A and vice versa.

A pair of positioning elements generally designated by the reference numerals 87 and 88 are disposed on the bench 76 to form pairs with the respective robots 77 and 78. More specifically, the positioning elements 87 and 88 are identical to each other and each of them includes a supporting rod erected on the bench 76 adjacent to that side thereof near to the lamination stacking truck 25 at its position as described above (see FIG. 9) and also nearly aligned with the outer longer edge of the leg laminations to be stacked on one another on the mating leg tablelet 33 or 34 on the truck 25 as will readily be understood from the illustration of FIGS. 8 and 16A. As shown with respect to positioning element 87 in FIG. 17A, each of the positioning elements 87 and 88 includes further a horizontal operating arm 89 slidably extending through the supporting rod as described above, a substantially L-shaped aligning member 90 having one vertically extending leg fixed at its lower end as viewed in FIG. 17A to the extremity of the horizontal arm 89 and another leg branched into a horizontal surface portion 90*a* and a vertical short portion 90*b* extending oppositely to the one leg and a proximity detector 91 fixedly extending through the one leg of the alligning member 90 on that side near to the supporting rod as shown in FIG. 17A.

The horizontal operating arm 89 is arranged to be moved toward and away from the lamination stacking truck 25 by a drive mechanism (not shown). The horizontal surface portion 90*a* serves to successively receive the leg laminations and the vertical short portion 90*b* is arranged to abut against the end of the stacked leg laminations on the mating leg tablelet 33 or 34 on the truck 25. The proximity detector 91 serves to sense the end of the lamination.

Figure 17A:
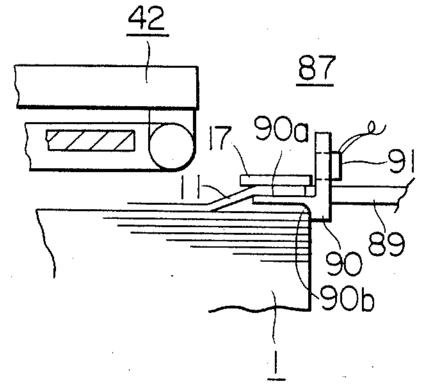
FIG. 17A is a front elevational view of one of the positioning elements shown in FIG. 8 and the associated components.
Figure 21:
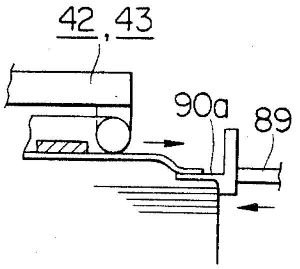
FIG. 21 is a front elevational view useful in explaining the operation of the positioning element shown in FIGS. 8 and 17.

As shown in FIG. 21, a leg lamination 11 for the leg 1 conveyed by the first conveyor 42 as described below slides along the upper surface of the horizontal surface portion 90of the positioning element 87 and then positioned by the first conveyor 42 until it falls upon a stack of leg laminations resulting in its state as shown in FIG. 17A. In FIG. 17A the leg lamination 11 has falled upon stacked lamination for the leg 1 while the leading end portion thereof rides on the horizontal surface portion 90*a* of the positioning element 87. Also a yoke lamination 17 is shown as being located on the leading end portion of the lamination 11.

Figure 17B:
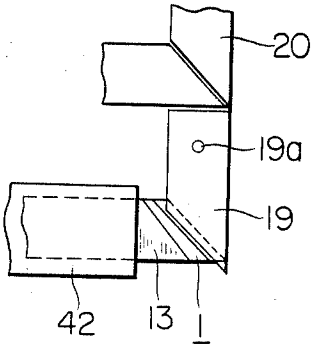
FIG. 17B is a plan view illustrating a leg lamination in the absence of the positioning element.
Figure 17C:
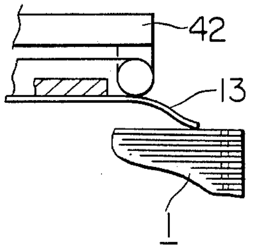
FIG. 17C is a front elevational view of the arrangement shown in FIG. 17B and the associated components.
Figure 17D:
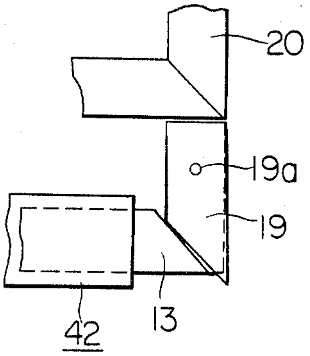
FIG. 17D is a view similar to FIG. 17B but illustrating the leg lamination completed to be stacked on the mating leg lamination.
Figure 17E:
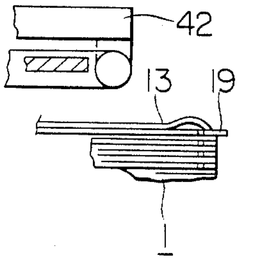
FIG. 17E is a front elevational view of the arrangement shown in FIG. 17D and the associated components.

Assuming that the horizontal surface portion 90*a* of the positioning element 87 is omitted, when for example, a leg lamination 13 conveyed by the first conveyor 42 reaches its position shown in FIG. 17B, the leading end portion thereof hangs down and has the leading end abutting against the uppermost one of the stacked laminations for the leg 1 as shown in FIG. 17C. This has resulted in the objections that the lamination 13 forces out the uppermost one 19 of stacked laminations for the yoke 4 and/or the lamination 13 is curved on the leading end portion as shown in FIGS. 17D and 17E. Thus, it is seen that the horizontal surface portion 90*a* plays in important role in performing the perfect automatic operation free from the objections as described above.

The embodiment of the present invention shown in FIGS. 8 through 15 and FIGS. 16A and 16B will now be described in conjunction with the operation thereof on the assumption that the magnetic laminations shown in FIGS. 2 and 3 are assembled into the E-shaped iron core illustrated in FIG. 1. It is also assumed that a lower tapered portion as shown in FIG. 7 of the E-shaped iron core has been already formed on the lamination stacking table 25*b*-25*c*-33-34 on the truck 25 in the process identical to that subsequently described except for the use of laminations having incremental widths. The truck 25 is put at a suitable level through the operation of the jacks 27 due to the drive mechanism 28 with the wheels 25*a* disengaging from the rails 29.

Figure 18:
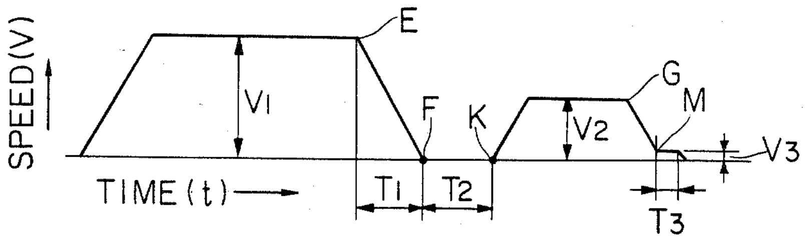
FIG. 18 is a graph illustrating conveying speeds of the conveyors for leg laminations.

After having been worked on the cutting and boring line in the preceding step, a leg lamination 11 (see FIG. 2) for the leg 1 of the iron core, is delivered to the flapper 65 (see FIG. 9). The lamination 11 and succeeding laminations have a predetermined constant width larger than that of the uppermost one of the stacked laminations as described above. At that time the flapper 65 is directed downward to transfer the leg lamination 11 to the upper surface of the third conveyor 62 traveling on the upper run and thence delivered via the guide 63 to the lower surface of the first conveyor 42 traveling on the lower run with the lamination 11 attracted by the mating permanent magnets 47 and 48. At that time the third conveyor 62 is equal in speed to the first conveyor 42 which travels at a high speed $V_1$ as shown in FIG. 18 wherein the speed of the two conveyors is plotted in ordinate against time in abscissa.

When the leading end of the lamination 11 travels past the third sensor 55, a servomotor (not shown) associated with the first conveyor 42 is entered into the stoppage mode of operation with a predetermined deceleration. At that time the lamination 11 on the first conveyor 42 is similarly decelerated until it is stopped at a predetermined position as shown by dotted trapezoid 11 in FIG. 19 with the first conveyor 42.

The lamination 11 is attracted by the permanent magnets 47 and 48 through the parallel endless belts 46 (see FIGS. 12 and 14) with attraction controlled so as to prevent the lamination 11 from slipping along the endless belts 46. If the permanent magnets 47 and 48 are too strong in attraction then the disadvantages result that the endless belts 46 must be driven with increasing energy while, in order to cause the lamination to fall by raising the permanent magnets, the rising stroke thereof should increase and so on. To this end, each of the permanent magnets 47 and 48 is first magnetized to a magnitude in excess of a required one and the adjusting magnetic strip 49 formed of a magnetic steel web is attracted to the permanent magnets 47 and 48 to bridge the upper ends thereof as described above in conjunction with FIG. 14. Then the thickness of the magnetic steel web can be changed to adjust a magnetic force developed from the lower ends of the permanent magnets 47 and 48.

Figure 19:
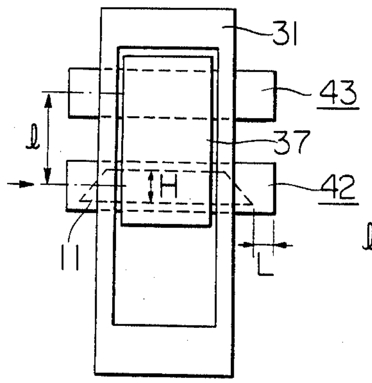
FIGS. 19 and 20 are fragmental plan views useful in explaining the operation of the conveyors for the leg laminations.

Referring back to FIG. 18, the lamination 11 fed at the high speed $V_1$ is decelerated at a point E and then stopped at a point F after $T_1$ seconds lamination 11 is in the state as shown in FIG. 19. At that time, the lamination is stopped where the distance L between the leading end of the lamination 11 and the righthand end as viewed in FIG. 19 of the first conveyor 42 is as short as possible, thereby to shorten the distance which the lamination 11 must be fed at a moderate speed $V_2$ as shown in FIG. 18. This measure results in a reduction in time interval needed for all the laminations to be stacked on one another. To this end, the third sensor 55 for sensing the central leading end of the lamination 11 is spaced from the righthand end surface as viewed in FIG. 12 of the first conveyor 42 by a distance $L_1$ as shown in FIG. 12 expressed by $$L_1 = \tfrac{1}{2}H + V_1^2/2\alpha$$

where $V_1$ designates the high speed as described above, $\alpha$ designates a deceleration, and H designates a maximum width of the lamination. This is because the sensing is effected at the central line in a direction of width of the lamination having both ends cut at angles of 45 degrees to the longitudinal axis. Alternatively, assuming that the first conveyor 42 is stopped at the end of a time interval $T_1$ after the deceleration thereof, the distance $L_1$ may be expressed by $$L_1 = \tfrac{1}{2} \times (H + V_1 \times T_1).$$

Figure 20:
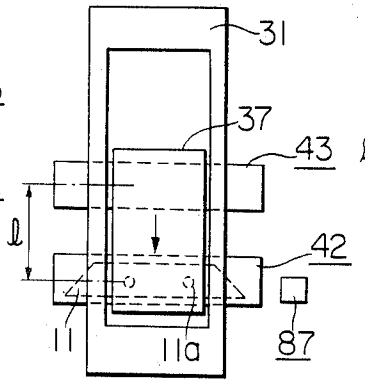

When the first conveyor 42 has been stopped as described above, the conveying carriage 37 is moved in the cross direction or the direction of the arrow shown in FIG. 20 by a distance l (see FIG. 20) to move the second conveyor 43 to be centrally positioned above the central tablelet 25*b* on the truck 25 in the longitudinal direction as shown in FIG. 10. The movement of the conveying carriage 37 together with the first and second conveyors 42 and 43 is effected by the numerical control in order to prevent the carriage 37 and conveyors 42 and 43 from receiving shocks upon the acceleration and deceleration thereof. Also, the distance l shown in FIG. 20 is equal to the distance between the central leg 2 and either of the outer legs 1 or 3 as shown in FIGS. 1 and 6.

While the conveying carriage 37 is being moved from its position shown in FIG. 19 to that shown in FIG. 20 during a time interval $T_2$ (see FIG. 18), the second conveyor 43 is initiated to be moved until the high speed $V_1$ is reached.

When the movement of conveying carriage 37 has been completed, the operating arm 89 (not shown in FIG. 30) of the positioning element 87 is moved toward the lamination through the operation of the handle 89 thereof due to the associated drive mechanism (not shown). Following this, the lamination 11 is forwardly fed at the moderate speed $V_2$ (see FIG. 18) along with the first conveyor 42. At that time the leading end of the lamination 11 deviates from its position where it opposes the permanent magnets 47 and 48 and accordingly that end hangs down due to its own weight to slide along the upper surface of the horizontal surface portion 90*a* of the positioning element 87 as shown in FIG. 21. Under these circumstances when the positioning hole 11*a* of the lamination 11 is fed past the fourth sensor 60 (see FIG. 12), the first conveyor 42 is decelerated at a deceleration $\alpha$ similar to that occurring after the high speed $V_1$ and reaches a low speed $V_3$ as shown in FIG. 18. The first conveyor 42 with the lamination 11 further forwardly travels at the speed $V_3$ until the fifth sensor 61 (see FIG. 12) senses the positioning hole 11*a* on the lamination 11 whereupon the first conveyor 42 is stopped.

A time interval $T_3$ (see FIG. 18) for which the low speed $V_3$ is held is set to a minimum magnitude which ensures that various laminations with different shapes are stopped at predetermined positions after the conveyance thereof and with the accuracy of stoppage remaining unchanged from one to another of the laminations. Thus, a spacing $L_2$ between the fourth and fifth sensors 60 and 61 respectively (see FIG. 12) is set according to the following expression:

$$L_2 = 1/2\alpha \times (V_1^2 - V_2^2) + V_3 \times T_3$$

Also in order to reduce the time interval during which the lamination is conveyed by either of the first conveyor 42 or second conveyor 43, it is desirable to position the lamination conveyed at a speed increased from the moderate speed $V_2$ to the high speed $V_1$. However, neither of the conveyors 42 or 43 includes a guide for leading the movement of the lamination in a direction of width thereof. Thus the lamination may be more or less shifted in the direction of width thereof during the conveyance thereof. Accordingly, the lamination may fly out from the conveyor 42 or 43 at a speed as high as $V_1$ if the fourth sensor 60 does not sense the positioning hole on the lamination, a fault occurs in that sensor, or if no hole was formed in the lamination on the cutting and boring line. This resembles a sword flying out from the conveyor at a high speed because the lamination has a thickness of from 0.3 to 0.35 mm and this is very thin. Also, the operator or operators may execute the lamination stacking operation in place of the robots 77 and 78 in order to rapidly stack the lamination on one another. At that time, it is very dangerous for a lamination to fly out from the mating conveyor. In order to avoid that danger, the speed $V_2$ is selected to have such a magnitude that the leading end of the lamination droops down due to its own weight and then the lamination falls spontaneously in front of the operator or operators.

On the other hand, the first conveyor 42 traveling at the high speed $V_1$ is stopped in response to the sensing of the leading end of the lamination by the third sensor 55. Thus the lamination is prevented from flying out from the first conveyor 42 unless the third sensor 55 fails to sense the leading end of the lamination due to a fault thereon. In the event of a failure of the third sensor 55, the next succeeding or fourth sensor 60 is arranged to issue a command emergency stoppage signal to automatically stop the first conveyor 42.

The foregoing described with reference to the first conveyor 42 is equally applicable to the second conveyor 43.

Figure 22:
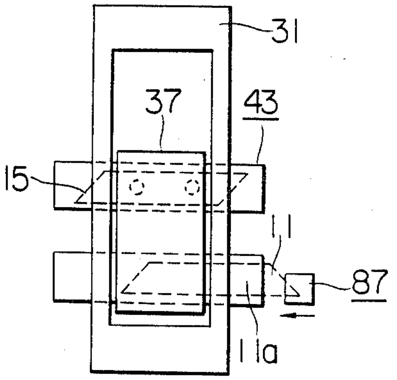
FIGS. 22, 23, 24, 25, 26, 27 and 28 are views similar to FIGS. 19 and 20 but illustrating the succeeding operations of the conveyors for leg laminations.

When the lamination 11 is stopped at its predetermined position with respect to the outer leg tablelet 33 (not shown in FIG. 22) as shown by a dotted trapezoid 11 in FIG. 22, four sets of the permanent magnets 47 and 48 on the first conveyor 42 are simultaneously raised to cause the magnetic attraction to disappear between the lamination 11 and the permanent magnets 47 and 48. Thus, the lamination 11 falls on the leg tablelet 33 so as to successively peel off from the first conveyor 42 starting with the leading end thereof. At this time, the pair of positioning pines **36*b* are inserted into the associated holes 11*a* on the falling lamination 11 to dispose the lamination 11 at its predetermined position to be stacked on the uppermost one of the stacked laminations for the leg 1. The positions of the positioning holes 11*a* on the lamination 11 relative to the associated positioning pin 36*b* have been preliminarily adjusted by rotating the handle 59**.

In order to keep the distance which the lamination falls onto the stack of laminations to about 80 mm, the second sensor 54 serves to sense the height of the laminations stacked on one another on the outer leg tablelet 33. When the second sensor 54 is turned on, the jacks 26 are driven to raise the lamination stacking truck 25. Then the raised truck 25 is lowered and stopped by the jacks 26 until the second sensor 54 is turned off. Also, the first sensor 53 is arranged to confirm the fall of the lamination and the turnoff of the first sensor 54 permits the conveying carriage 37 to be moved in the cross direction.

At and after a point of time when movement of the lamination 11 in the cross direction by the conveying carriage 37 has been completed, carrying of the lamination 15 for the central leg 2 in the second conveyor 43 is initiated in the same manner as the lamination 11 for the outer leg 1 in the first conveyor 42.

Figure 23:
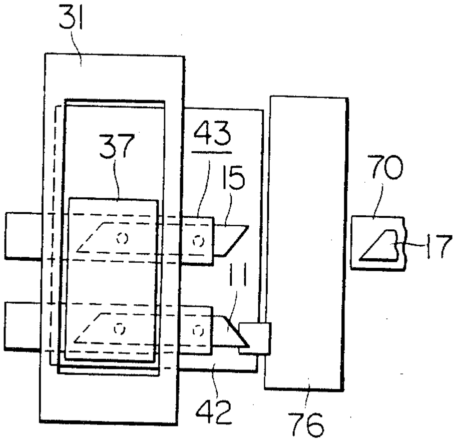

Then the process as described above is repeated. Briefly, the lamination 15 conveyed by the second conveyor 43 running at the high speed $V_3$ is stopped at its predetermined position shown by a dotted parallelogram 15 in FIG. 22 with the second conveyor 43. Upon the completion of the stoppage thereof, the lamination 15 is immediately conveyed at the moderate speed $V_2$ by the second conveyor 43 a further predetermined distance to occupy its position as shown by a dotted parallelogram 15 in FIG. 23, followed by the fall of the lamination 15.

From the foregoing it is seen that the lamination 15 behaves in the same manner as the lamination 11 excepting that, for the lamination 15, the movement in the cross direction thereof is omitted.

When the first sensor 53 is turned off in response to the fall of the lamination 15, the second conveyor 43 is initiated to travel at a high speed. Upon reaching the high speed $V_1$ the lamination 12 for the outer leg 3 is permitted to enter the second conveyor 43.

Following this, the flapper 65 is directed to its upper position as viewed in FIG. 9 and the lamination 17 for the yoke 4 cut and bored passes through the flapper 65, the fourth, sixth and fifth conveyors 64, 67 and 66 respectively in the named order and then slides within the chute 73 until it reaches the pinch rollers 74 which are being rotated. The lamination 17 enters an opening between the rollers 74 and is then fed to the upper surface of the first or lower receiving plate 70 disposed below the second or upper receiving plate 71 and at its upper position (see FIG. 9.). The pinch rollers 74 have a common rotational speed controlled so that the rollers 74 are given a common deceleration in response to the sensing of the tail end of the lamination 17 by the sixth sensor 75 and also then the rollers 74 have a common terminal speed adjusted so as to control the outgoing of the lamination 17 from the pinch rollers 74 and that a common terminal speed thereof is adjusted so as to stop the lamination 17 on that side of the first receiving plate 70 near to the pinch roller 74 as much as possible.

When the lamination 17 is resting on the first receiving plate 70, the latter is lowered and stopped at its lower position shown at broken line in FIG. 9. At the lower position of the first plate 70, the robot 77 or the operator can readily remove the lamination 17 from the first plate 70. With the robot 77 used, the stoppage of first receiving plate 70 initiates the robot 77 to be operated in accordance with the fundamental operations preliminarily stored in the associated computer. More specifically, the holding arm 81 of the robot 77 is moved in the direction of the arrow D as shown in FIG. 16A, concurrently with corresponding rotations of the rotatable arms 79 and 80 thereof while the four sensors 83 through 86 look for the positioning hole **17*a* on the lamination 17. When all the sensors 83 through 86 are turned off to sense the positioning hole 17*a*, the bench 76 along with the rotatable arms 79 and 80 and the holding arm 81 is lowered with the relative positions of all the arms remaining unchanged until the vacuum pads 82 are contacted by the lamination 17. At that time the vacuum pads 82 are initiated to be evacuated to stick the lamination 17 to the holding arm 81 through the evacuated vacuum pads 81**.

Figure 24:
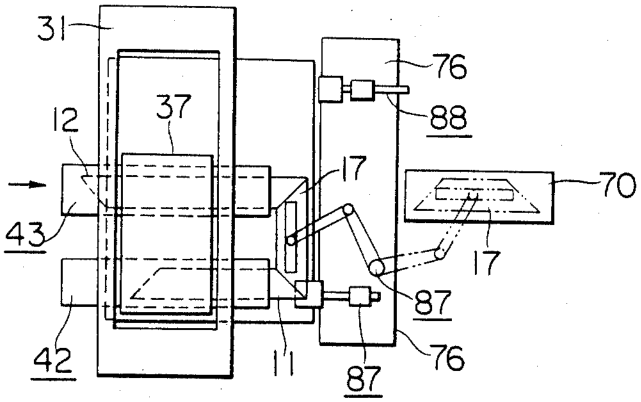

Subsequently, the bench 76 with the rotatable arms 79 and 80 and the holding arm 81 holding the lamination 17, is raised to a predetermined level and all the arms are moved in the direction of the arrow E shown in FIG. 16A to reach their positions preliminarily stored in the computer as shown in FIG. 24. At that time the positioning hole **17*a* on the lamination 17 is centered on the positioning pin 36*a* extending through the stacked laminations for the yoke 4 as shown in FIG. 9**.

Following this, only the holding arm 81 with the lamination 17 is rotated in the direction of the arrow F shown in FIG. 16A about the center of the central portion thereof pivotally connected to the other end of the second rotatable arm 80. This results in the lateral edge of the lamination 17 actuating the proximity detector 91 on the positioning element 87 disposed on the bench 76. The actuation of the proximity detector 91 causes the rotation of the holding arm 81 to be stopped and also air to be introduced into the vacuum pads 82. Thus the lamination 17 stuck to the vacuum pads 82 falls at its predetermined position on the stacked laminations for the yoke 4. With the lamination 17 stuck to the holding arm 81 through the evacuated vacuum pads 82, both ends of the lamination 17 hang down to form a narrow gap between each end thereof and the lamination 11 or 15 stacked on the mating stacked lamination. However, the lamination 17 is arranged to stretch and contact the laminations 11 and 15 simultaneously with the fall thereof. Thus, it is easy to cause the lamination 17 to abut against the laminations 11 and 15.

In order to align the end surfaces of the yoke laminations which are stacked on one another in the later steps, with one another, it is effective to dispose the proximity detector 91 to be slightly spaced from the stacked laminations for the yoke 4 to permit the associated laminations to be stacked on one another in a slightly disordered state after which that surface facing the stacked laminations of the vertical portion 90*b* of the positioning element 87 is utilized to align the stacked laminations with one another when the next succeeding yoke lamination is stacked on the stacked laminations.

This is equally applicable to the positioning element 88.

It is noted that only the horizontal movement of the lamination 17 is effected by the operation of the robot 77 starting with the taking-up of the lamination from the first receiving plate 70 and terminating at the stacking of that lamination on the stacked laminations.

Figure 25:
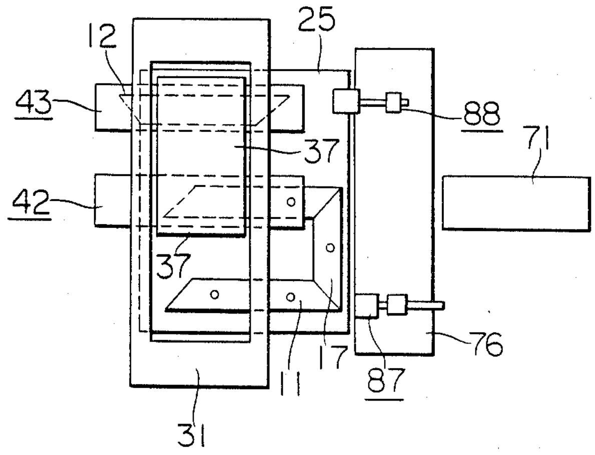
Figure 26:
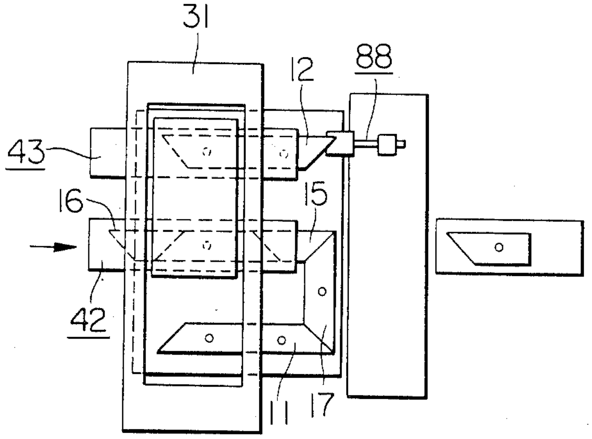

At about the end of the process of positioning the lamination 17 for the yoke 4 on the stacked laminations, the lamination 12 for the outer leg 3 conveyed by the second conveyor 43 is changed from its state shown in FIG. 24 to its state shown in FIG. 26 through its state shown in FIG. 25. In other words, the conveying carriage 37 has changed from its lower position shown in FIG. 24 to its upper position as shown in FIG. 25 or 26 through the movement thereof in the cross direction until the lamination 12 on the second conveyor 43 now stopped is put at its position where the leading end thereof is engaged by the positioning element 88.

Following this, the lamination 18 for the yoke 5 is conveyed by the conveyors 64, 67 and 66 in the same manner as described above in conjunction with the lamination 17 for the yoke 4 until the lamination 21 rides on the second or upper receiving plate 71.

It is noted that, when the first receiving plate 70 is lowered to its lower position as described above, the second receiving plate 71 is somewhat lowered to receive the lamination 18 passed through the pinch roller 74 and again lowered to be put in its lower position shown in broken line in FIG. 9 to deliver the yoke lamination 18 to the other robot 78. Thus the second receiving plate 71 effects the lowering movement at two stages.

About the time when the robot 78 takes out the lamination 18 from the second receiving plate 71, the leg lamination 16 for the central leg 2 conveyed by the first conveyor 42 in the same manner as described above in conjunction with the lamination 11 has already reached its position shown by dotted parallelogram in FIG. 26 and been stopped there. Then, the lamination 16 falls at its predetermined position to be stacked on the leg lamination 15 as shown in FIG. 27 to form a central leg lamination on the first lamination layer as described above in conjunction with FIGS. 4 and 6.

Following this, the robot 78 is operated to stack the yoke lamination 18 for the yoke 3 on the associated stack of the yoke laminations.

Figure 27:
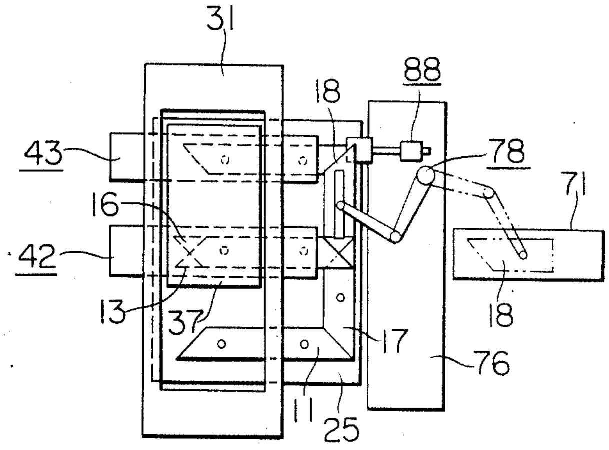
Figure 28:
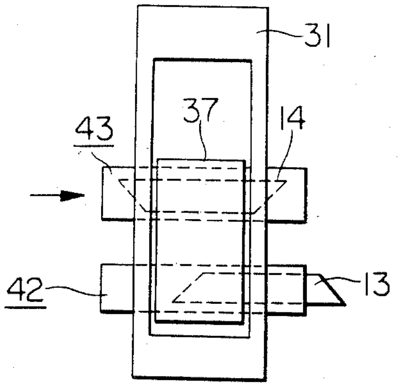

About the time when the robot 78 stacks the yoke lamination 18 as described above, the next succeeding lamination 13 for the outer leg 1 conveyed by the first conveyor 42 is stopped at its position shown by dotted parallelogram in FIG. 27 with the first conveyor 42. The position of the lamination 13 is identical to that of the lamination 11 shown in FIG. 18. Then the leg lamination 13 occupies the position of the lamination 11 shown in FIG. 20 after which the lamination 13 falls on its predetermined position for stacking as shown in FIG. 28. Meanwhile, the lamination 14 for the outer leg 3 is conveyed by the second conveyor 43 as the lamination 12 and the conveying carriage 37 is moved in the cross direction to occupy its position shown in FIGS. 19, 25, 26 or 27. At that time the robot 77 stacks the leg lamination 19 for the yoke 4 on the lamination 17 while the associated positioning element 87 positions the lamination 19 in a similar manner to that shown in FIG. 24.

Subsequently, the leg lamination 14 for the outer leg 3 is stacked on the lamination 12 in the same manner as the latter lamination and then the robot 78 stacks the yoke lamination 20 or the yoke lamination 18 in a similar manner to that described above in conjunction with the latter lamination 18. At that time the second lamination layer has been completed on the first lamination layer as shown in FIG. 6.

Following this, the process as described above is repeated to form a stack of laminations with wide equal widths including the first layers alternating with the second layers to reach a predetermined height. Thereafter the process as described above is repeated with laminations similar in shape to those described above but having widths decreased stepwise to form the upper tapered stack of laminations as shown in FIG. 7. At that time the E-shaped iron core shown in FIG. 1 is completed.

It will readily be understood that during the stacking operation the jacks 27 are intermittently operated in response to an output from second sensor 54 to maintain the distance of fall of each lamination equal to about 80 mm as described above.

From the foregoing it is seen that during the single reciprocating movement of the conveying carriage 37 the laminations are stacked on each layer of laminations in the order of the reference numerals for the legs and yokes of the iron core or the legs 1, 2 and 3 and the yokes 4 and 5.

Therefore, the laminations are delivered to the flapper 65 in the order of the laminations cut from the magnetic strips as shown in FIGS. 2 and 3 starting with the righthand one as shown in those Figures. Delivering the laminations to the flapper 65 in this way forms one of the features of the present invention.

Figure 29:
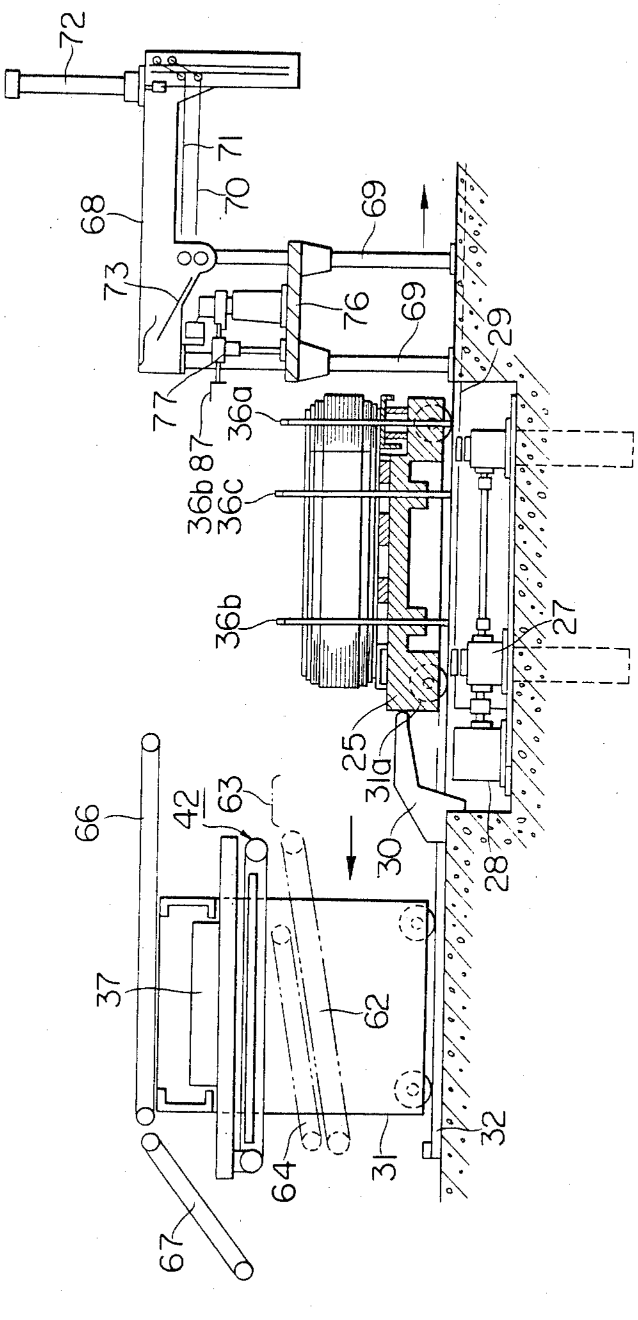
FIG. 29 is a front elevational view of the arrangement shown in FIG. 9 after the lamination stacking operation has been completed, with parts omitted.

Upon the completion of the stacking operation, the supporting truck 31 is moved in a lefthand direction as viewed in FIG. 9 to be put at its position shown in FIG. 29 to clear a space above the completed iron core on the lamination stacking truck 25. Then the jacks 27 are operated to cause the wheels 25*a* on the truck 25 to ride on the rail 29. Thus the large diameter portions about 20 mm long of the positioning pins 35*a* and 36*b* are developed from the mating holes on the iron core. This results in the easy removals of the pins from the iron core. If the positioning pin serving as a guide for the hole on the lamination includes a straight line-shaped portion substantially contacted by the mating hole on the iron core throughout the entire height of the resulting stack of laminations, then the pin is very difficult to be removed from the hole due to a frictional force developed therebetween.

After the removal of the positioning pins from the completed iron core, the bench 76 can be raised to move the lamination stacking truck 25 in a righthand direction as viewed in FIG. 29 by itself to reach the next succeeding position where bolts are threaded into the respective holes on the iron core to fasten it into a unitary structure. Then the phase windings 6, 7 and 8 are respectively disposed around the legs, 1, 2 and 3 as shown in FIG. 1.

On the other hand, the yoke laminations 22 and 24 for the yoke 9 and the yoke laminations 21 and 23 for the yoke 10 are automatically taken out from the cutting and boring line during the stacking operation and those yoke laminations are manually stacked on one another to assemble yokes 9 and 10 of the iron core with the three phase windings 6, 7 and 8 as shown in FIG. 1. This results in a three-phase core type transformer.

During the lamination stacking operation a fault may occur on the apparatus as described above. Alternatively, a piece of iron sheet with an uneven surface (which is called a "oil duct" and has not been described in the specification) may be interposed between a pair of adjacent lamination layers disposed in the intermediate stack portion formed of the laminations having wider equal widths as shown in FIG. 7. Also, the state of stacking of the laminations may be desired to be checked for each of the lamination layers. The state of the stacked laminations to be checked involves whether or not the resulting E-shape is correct, whether or not the stacked laminations come down and so on. Under these circumstances, a corresponding repair, the interposition of the oil duct or the checking can be effected after the supporting truck 31 has been moved to its position as shown in FIG. 29.

From the foregoing it is seen that, according to the present invention, a pair of conveyors is capable of conveying leg laminations magnetically attracted to the lower portions thereof respectively and can be moved in the cross direction in reciprocating manner above a lamination stacking table so as to maintain predetermined equal spacings between pairs of adjacent legs of an iron core formed on the table. Thereby the leg laminations are stacked on one another to form the respective legs. Thus, it is ensured that the leg laminations can be accurately positioned and also the stacking of the leg laminations can be easy to be automatized. In addition, the laminations are prevented from being given strains during their handling. This can prevent adversely effecting the characteristics of the resulting iron core.

While the present invention has been illustrated and described in conjunction with a single preferred embodiment thereof it is to be understood that numerous changes and modifications may be resorted to without departing from the spirit and scope of the present invention. For example, all the components for stacking yoke laminations on one another for each of the yokes 4 or 5 may be omitted and those yoke laminations may be manually stacked on one another. In the latter case, three legs of the iron core are formed of the leg laminations by the corresponding portions of the apparatus as described above.

What is claimed is:

1. An apparatus for assembling an iron core, comprising:

(a) a plurality of lamination stack supporting members, said supporting members being spaced in a cross direction and extending in parallel in a longitudinal direction perpendicular to said cross direction; said plurality of supporting members being relatively movable in said cross direction; and (b) means for successively carrying individual magnetic laminations first predetermined equal distances in said longitudinal direction and second predetermined distances in said cross direction onto said plurality of supporting members to form stacks of the magnetic laminations thereon for a plurality of legs of the iron core, said carrying means including:

(1) first and second conveyors disposed above said plurality of supporting members and movable in said cross direction to selectively oppose selected adjacent first and second ones of said plurality of supporting members; said first conveyor and said second conveyor respectively having a first lower run and a second lower run, said first and second lower runs being movable in said longitudinal direction and having respective bottom surfaces for opposing said selected first and second ones of said plurality of supporting members, and (2) magnetic attracting means, disposed above each of said first and second lower runs, for magnetically attracting magnetic laminations to individual ones of said bottom surfaces such that the magnetic laminations are carried by said first and second lower runs in said longitudinal direction with movement thereof in said longitudinal direction, and in said cross direction during movement of said first and second conveyors in said cross direction.

2. An apparatus as in claim 1, further comprising means for alternatingly providing individual magnetic laminations to said first conveyor and to said second conveyors during longitudinal movement of said first and second lower runs, to be carried thereby.

3. An apparatus as in claim 2, wherein said first and second lower runs run from a first longitudinal end thereof to a second longitudinal end thereof, said providing means including means for conveying individual magnetic laminations to a predetermined cross position at said first end, each of said first and second conveyors being movable in said cross direction to said cross position to receive an individual magnetic lamination from said conveying means.

4. An apparatus as in claim 1, wherein each of said plurality of supporting members is rectangularly shaped, the longer sides thereof extending in said longitudinal direction.

5. An apparatus as in claim 1, further comprising means for simultaneously moving said first and second conveyors together in said cross direction with an adjustable space therebetween in said cross direction, and means for adjusting the length of said space in said cross direction.

6. An apparatus as in claim 5, further comprising a fixed frame, said first and second conveyors comprising longitudinally extending endless conveyor belts having said first and second lower runs therealong slidably mounted on said frame for movement in said cross direction.

7. An apparatus as in claim 1, further comprising a truck movable in said longitudinal direction, said plurality of supporting members being disposed on said truck.

8. An apparatus as in claim 7, further comprising means for vertically moving said truck between said upper and lower positions.

9. An apparatus as in claim 8, further comprising longitudinally extending rails beneath said truck, said truck having wheels for engaging said rails when said truck is in said lower position.

10. An apparatus as in claim 1, wherein each of said first and second conveyors can be moved to a position where each of said first and second conveyors as a whole deviates from a position where it is located above the associated one of said lamination stack supporting members.

* * * * *